Oct. 23, 1923.

R. H. KIMES ET AL 1,471,850

RECORDING DEVICE FOR MOTOR VEHICLES

Filed April 17, 1922      3 Sheets-Sheet 1

Inventor
R. H. KIMES.
O. F. SCHMIDT.

By Edward S. Reed.

Attorney

Oct. 23, 1923. 1,471,850
R. H. KIMES ET AL
RECORDING DEVICE FOR MOTOR VEHICLES
Filed April 17, 1922 3 Sheets-Sheet 2
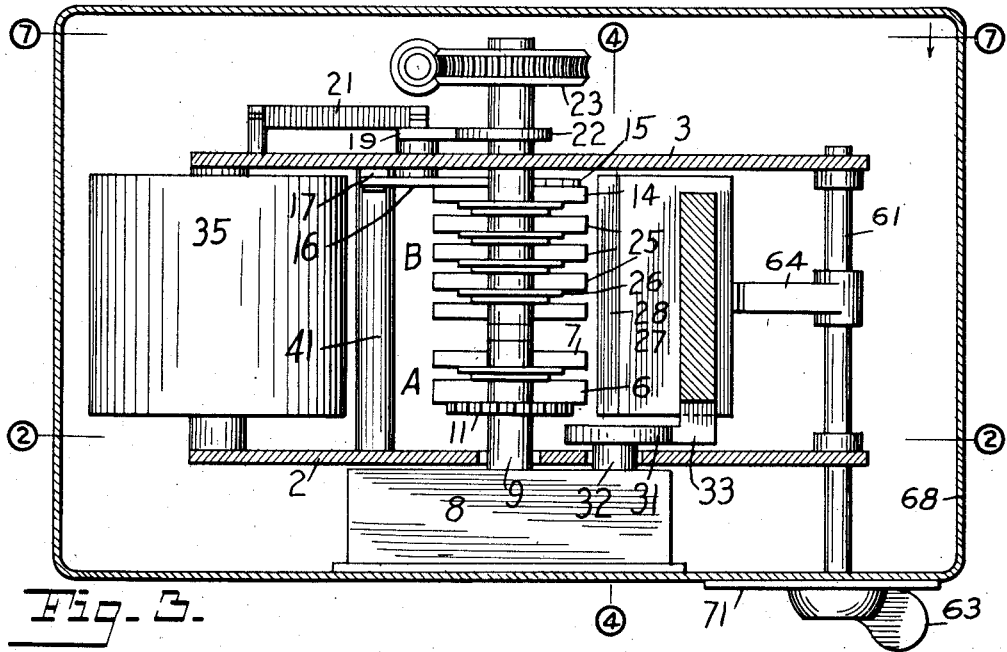
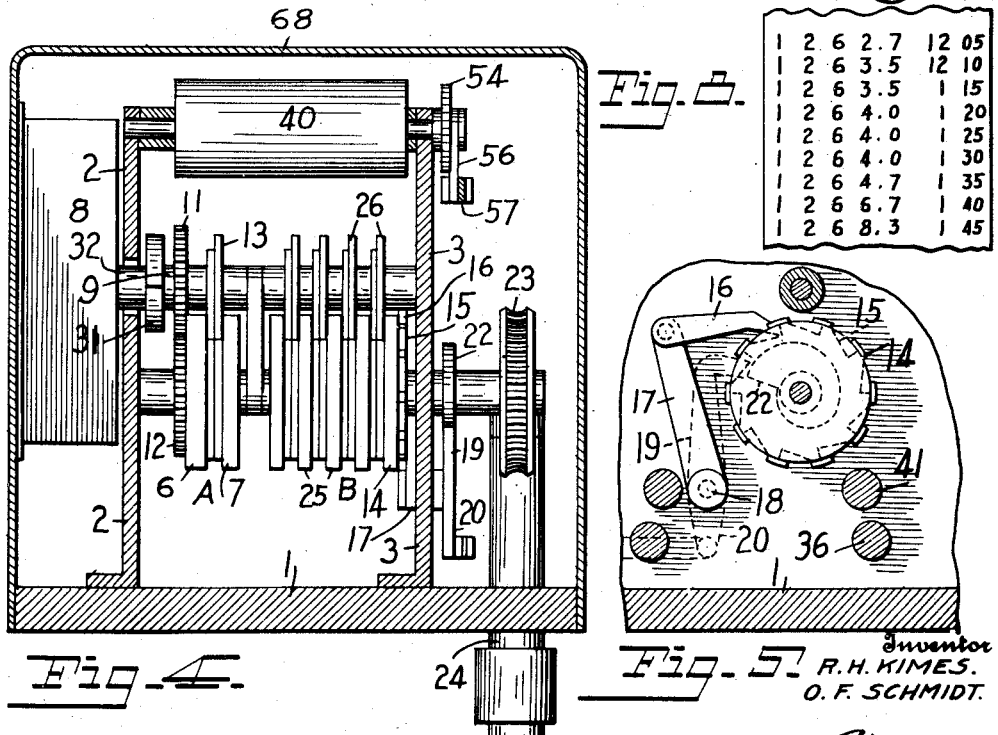
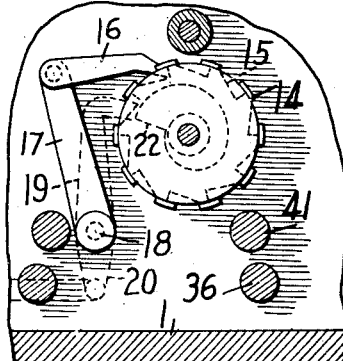

Oct. 23, 1923.

R. H. KIMES ET AL 1,471,850

RECORDING DEVICE FOR MOTOR VEHICLES

Filed April 17, 1922    3 Sheets-Sheet 3

Inventor
R. H. KIMES.
O. F. SCHMIDT.

By

Attorney

Patented Oct. 23, 1923.

1,471,850

UNITED STATES PATENT OFFICE.

ROBERT H. KIMES AND OSCAR F. SCHMIDT, OF DAYTON, OHIO, ASSIGNORS TO OHMER FARE REGISTER COMPANY, OF DAYTON, OHIO, A CORPORATION OF NEW YORK.

RECORDING DEVICE FOR MOTOR VEHICLES.

Application filed April 17, 1922. Serial No. 553,834.

*To all whom it may concern:*

Be it known that we, ROBERT H. KIMES and OSCAR F. SCHMIDT, citizens of the United States, residing at Dayton, in the county of Montgomery and State of Ohio, have invented certain new and useful Improvements in Recording Devices for Motor Vehicles, of which the following is a specification, reference being had therein to the accompanying drawing.

This invention relates to a device for recording the operation of motor vehicles and the like and is designed more particularly to provide a record of the movements of an automobile truck, or other vehicle which is operated by a driver other than the owner.

One object of the invention is to provied a device to preserve a record of the movements of a motor vehicle, the operation of which device will be beyond the control of the driver.

A further object of the invention is to provide a device to register both time and distance and to automatically take a record of both registrations at predetermined intervals.

A further object of the invention is to provide such a device in which the operation of the record taking devices will be controlled by the operation of the motor.

Other objects of the invention will appear as the mechanism is described in detail.

Figure 1:
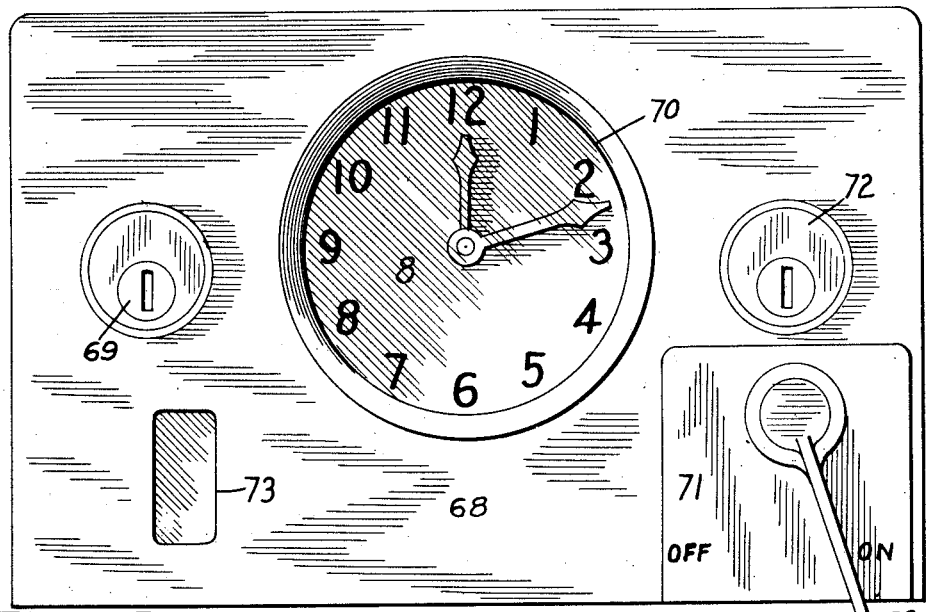
Figure 2:
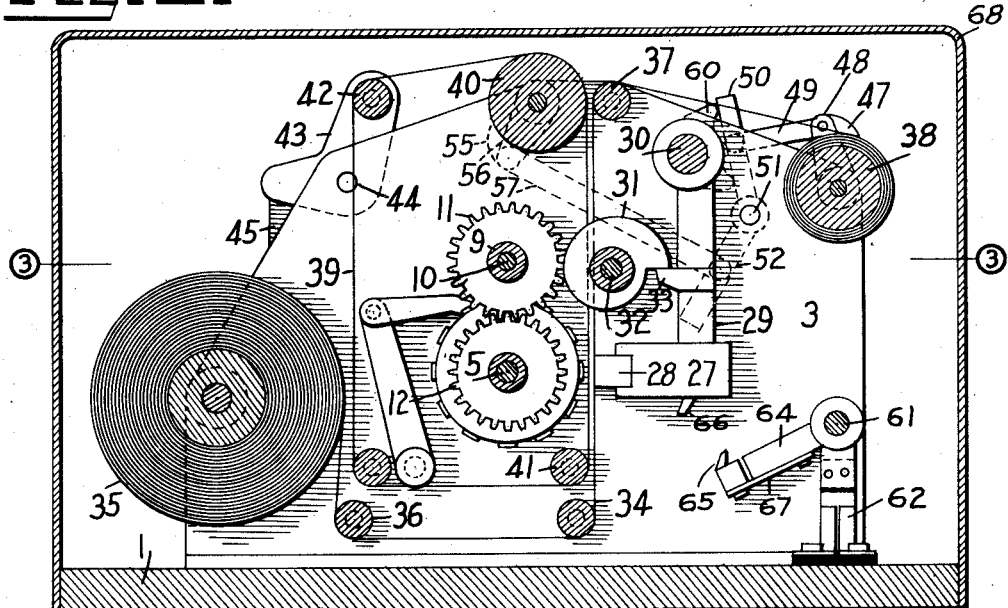
Figure 6:
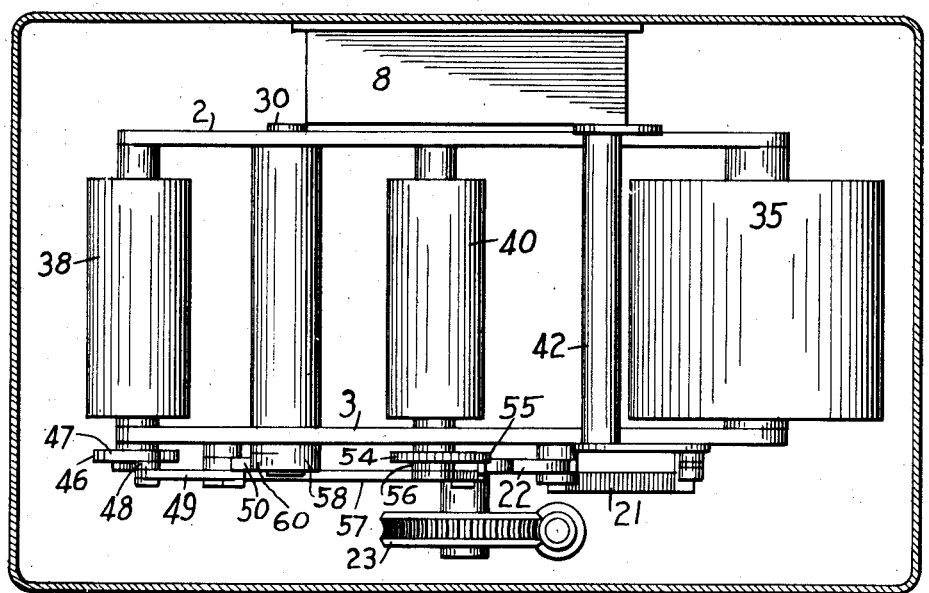
Figure 7:
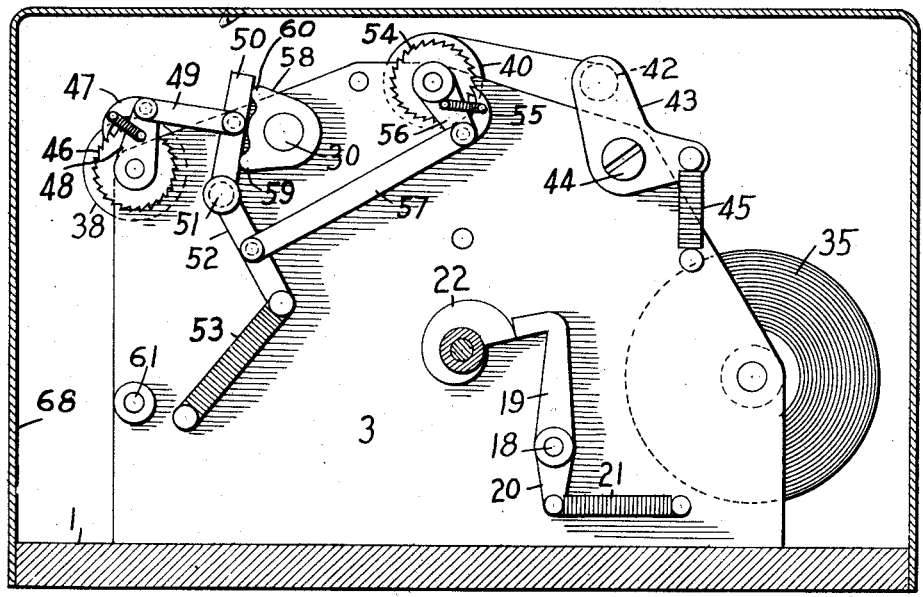

In the accompanying drawings Fig. 1 is a front elevation of a device embodying our invention; Fig. 2 is a sectional view taken on the line 2—2 of Fig. 3; Fig. 3 is a sectional view taken on the line 3—3 of Fig. 2; Fig. 4 is a sectional view taken on the line 4—4 of Fig. 3; Fig. 5 is a detail view of the actuating devices for the distance register; Fig. 6 is a top plan view of the mechanism; Fig. 7 is a sectional view taken on the line 7—7 of Fig. 3; and Fig. 8 is a facsimile of a portion of a record produced by the mechanism.

In carrying out our invention we provide two registering devices, one for registering time and the other for registering distance. Cooperating with these devices is a device for taking a record therefrom, this record taking device being so controlled that it will operate automatically to take a record of both time and distance at predetermined intervals. The record may be taken at intervals of time or at intervals of distance but we prefer to take a record at fixed intervals of time, for example, every five minutes. In this manner it can be determined by comparing two successive records whether the vehicle was in operation and if so the distance traveled and the speed at which it traveled. The record taking device is also controlled by the operation of the motor in such a manner that no record will be taken so long as the motor is idle, thus enabling it to be determined from the record whether or not the motor is allowed to run while the vehicle is not in operation. The mechanism by which we accomplish these results may take various forms and it will be understood that that here shown has been chosen for the purposes of illustration only.

In the particular form of the mechanism here illustrated, the device comprises a base plate 1 having mounted thereon two upwardly extending plates, or brackets, 2 and 3, these brackets constituting a supporting frame for the several parts of the mechanism. Mounted on this supporting frame are two sets of registering devices, A and B, the registering device A serving to register the time and the registering device B serving to register the distance traveled by the vehicle. As here shown, these registering devices are in the form of printing counters and are rotatably mounted on a counter shaft 5. The time register A consists of a minutes counter wheel 6 and an hour counter wheel 7. The minutes counter wheel is provided on its periphery with figures, preferably in the form of type, to register the time in predetermined units. In the present instance the time is registered at intervals of five minutes and, therefore, the minutes wheel 6 is a twelve point wheel and is provided with figures 00 to 55 in multiples of five minutes. The hour counter wheel 7 is also shown in the present device as the twelve point wheel and is provided on its priphery with the figures 1 to 12. The minute wheel is driven from clock mechanism, as shown at 8, which is connected with a sleeve 9 mounted on a shaft 10 and having secured thereto a gear 11 which meshes with a gear 12 on the minute counter wheel, the ratio of gearing being such that the minute wheel will be advanced a single step, or unit of five minutes, during each five minutes of time. The minutes counter wheel is connected with the hour counter wheel by means of transfer gearing 13 of a well known type, which serves to advance the hour wheel one step for each complete rotation of the minute wheel.

The distance registering device B is also shown in the form of printing counters loosely mounted on the shaft 5, and, in the present instance, these printing counters are ordinary ten point counter wheels and are provided on their peripheries with the figures 0 to 9, inclusive. The units counter wheel 14 is actuated from a moving part of the vehicle, such as one of the wheels or the driving shaft, in such a manner that it will register the distance traveled by the vehicle. As here shown, this units counter wheel has secured thereto a ratchet wheel 15 with which cooperates a pawl 16 carried by a pawl arm 17 mounted on a stud shaft 18 carried by the frame member, or bracket, 3. The pawl arm is actuated by the lever 19 also mounted on the stud shaft 18 and rigidly connected with the pawl arm. This lever has connected therewith a rock arm 20 which is acted upon by a spring 21 which tends to move the same in a direction to cause the pawl to advance the ratchet wheel. The movement of the lever 19 and the pawl 16 under the influence of the spring 21 is controlled by a cam 22 rigidly secured to the shaft 5. The shaft 5 is operatively connected with a moving part of the vehicle and in the present instance has secured thereto a worm wheel 23 which is driven by a worm connected with a flexible shaft and leading to the wheel or other movable part of the vehicle from which the distance is to be computed, this flexible shaft being here shown as mounted in a casing 24 extending through the base plate 1. In the present arrangement of the mechanism the connection between the shaft 5 and the moving part of the vehicle is such that the shaft will make one complete rotation for each one-tenth of a mile traveled by the vehicle. Consequently, the pawl 16 will operate to advance the units counter wheel one point upon each rotation of the shaft 5 and the counter wheel will make one full revolution for each mile traveled by the vehicle. The count is transferred from the units wheel to the succeeding counter wheels 25 by transfer gearing 26 of any suitable character, which will cause the succeeding counter wheel to advance one point for each rotation of the preceeding counter wheel.

A record may be taken from the printing counters in any suitable manner but we prefer to provide means for simultaneously taking a record on a single record sheet, from both registering devices and in the particular form of the device here shown we have provided a platen 27 extending across both registering devices and having a yieldable contact member 28. As here shown, this platen is carried by an arm 29 which is pivotally mounted on a shaft 30 journaled in the frame members 2 and 3 so that the platen is free to swing toward and from the printing counters of the two registering devices. Operative movement is imparted to the platen by means of a spring, as will be hereinafter described, and the movement of the platen under the influence of the spring is, in the present instance, so controlled by the clock mechanism that an operative movement will be imparted to the platen every five minutes. To this end we have provided a cam 31 which is mounted on a shaft 32 so connected with the clock mechanism 8 that it will make one rotation for each five minutes of time registered by the clock. The cam is here shown as an ordinary snail type and is arranged to act upon a projection, or lug, 33 carried by the platen supporting arm 29, the arangement being such that as the cam rotates the platen will be gradually retracted and when the shoulder of the cam passes the projection 33 the platen will be released and caused to move into operative engagement with the type wheels, or rather with the record sheet which is interposed between the same and the type wheels.

The record may be taken on a record sheet of any suitable character which may be interposed between the type wheels and the platen. As here shown, the record sheet is in the form of a web of paper 34 which is fed from a roll 35 about guides 36, thence upwardly between the platen and the type wheels and about a guide 37 to a rewinding roller 38. Ink may be applied to the type wheels for printing a record in any desired manner, but we prefer to employ an ink ribbon which is interposed between the type wheels and the record sheet. In the present construction we have embodied an endless ink ribbon 39 which passes over a feeding drum 40 above the type wheels, thence downwardly between the type wheels and the record sheet, about guides 41, thence upwardly about a guide 42 to the feeding roller. The guide 42 is carried by rock arms 43 pivotally mounted at 44 and acted upon by a spring 45 to maintain the inking ribbon taut. Feeding movement may be imparted to the record strip and to the ink ribbon in any desired manner, but preferably both are advanced step by step upon each operation of the printing mechanism.

In the construction here shown, the rewinding roller 38 is provided with a ratchet wheel 46 with which cooperates a spring pressed pawl 47 carried by a pawl arm 48 mounted on the axis of the rewinding roller. This pawl arm is connected by a link 49 with a rock arm 50 mounted on a shaft 51 and having rigidly connected thereto a second rock arm 52 which, in the present arrangement, extends downwardly from the shaft 51 and is acted upon by a spring 53, which tends to move the same in a direction to move the pawl 47 rearwardly over the ratchet wheel. The feeding roller 40 for the ink ribbon is also provided with a ratchet wheel 54 with which cooperates a spring pressed pawl 55 carried by a pawl arm 56 mounted on the axis of the roller 40 and connected by a link 57 with the rock arm 42. The spring 53 also acts through the rock arm 50 upon the platen to impart operative movement thereto. In the present construction, a cam 58 is mounted on the shaft 30 and rigidly connected with the arm 29 which carries the platen. This cam has two shoulders, or projections, 59 and 60, both of which will engage with the edge of the rock arm 50 when the platen is in its normal position. When the platen is in its normal position it is withdrawn slightly from the type wheels so that the record strip and the ink ribbon may be out of contact with the type wheels and the record will not be marred by the rotation of the type wheels. When the platen is retacted by the action of the cam 31 the lower projection 59 of the cam 58 will act on the rock arm 50 to rock the same against the action of the spring 53, and this movement of the rock arm will cause the pawls 47 and 55 of the rewinding roller and the ink ribbon roller to move forwardly, thus advancing both the record sheet and the ribbon. When the shoulder of the cam 31 has passed the projection 33 on the platen arm, the spring 53 acting through the rock arm 50 and cam 58 will impart forward movement to the platen, thus causing it to press the record sheet and the ink ribbon against the type. The upper projection 60 of the cam 58 serves to retract the platen and hold the same normally in an inoperative position. The platen is retracted a very slight distance, just enough to free the record sheet and the ribbon, and, consequently, the momentum acquired by the platen during its forward movement will be sufficient to carry the same into contact with the type wheels after the projection 60 of the cam 58 has engaged the rock arm 50, but the action of this projection on the rock arm will cause the platen to be instantly withdrawn. The platen operating cam 31 may be so timed with relation to the time printing counters that these counters will always be in printing position during the operation of the platen and there will be no possibility of forward movement being imparted thereto during the contact of the platen therewith. The distance counters being actuated periodically by the cam 22, it is very improbable that movement will be imparted thereto at the instant the platen engages the same, but obviously, if thought necessary, alining devices of a well known type could be utilized to prevent the movement of the type wheels during the operation of the platen.

It is desirable also that the records should be taken only when the motor of the vehicle is in operation, as this will permit the record to indicate whether or not the motor operated while the vehicle was idle. To this end we have provided means controlled by a part of the engine mechanism for controlling the operation of the printing mechanism. As here shown, this means is in the form of a locking device, which, when the motor is idle, will lock the printing mechanism against operation. The lock may be controlled from any suitable part of the engine mechanism, but we have here shown it as applied to the ignition switch. This switch is not shown in detail but is actuated by a shaft 61 mounted on a bracket 62 and having an operating handle 63 which is moved from one position to another to open or close the ignition circuit. Rigidly connected with this shaft is a lock arm 64 having at its free end a projection, or nose, 65 which is so arranged with relation to the shaft 61 that when the ignition switch is moved to its open or "off" position the nose 65 of the locking arm will lie in the path of a projection, or nose, 66 on the platen 27. The nose 65 of the lock arm is preferably yieldable with relation to the arm and, as here shown, it is connected thereto by a flat spring 67. If the ignition switch is opened when the platen is in its forward position the nose 65 will lie in the rear of the nose 66 on the platen and as the platen is retracted the nose 66 will ride over the nose 65 and when it has passed the same the nose 65 will spring into place in front of the nose 66, thus locking the platen in its retracted position and preventing any further record being taken until the ignition switch has been closed. Upon the closing of the ignition switch the platen will be released and will move forwardly until the projection 33 engages the cam 31 and a record will be taken as soon as the cam has completed its rotation. Obviously, the first record taken may not cover a complete interval of five minutes, but all the succeeding records will cover such an interval, which is sufficient for all practical purposes.

The mechanism as a whole is enclosed in a casing 68 which rests upon the base 1 and which may be locked to the base by a suitable lock, as shown at 69. The casing is provided in its front wall with an opening 70 to expose the face of the clock and with an opening 71 to register with the bracket which carries the ignition switch. If desired, a lock 72 may be provided for locking the ignition switch in its open, or "off" position. We have also shown the casing with an opening 73 through which the amount of paper remaining on the roll 35 may be determined without opening the case.

It will be apparent from the foregoing description that with this recording device a record of both time and distance is taken every five minutes if the engine is operating, that this record will show whether or not the engine is operating, whether or not the vehicle is in motion, and the speed at which the vehicle is moving, and will also show the time that the vehicle stood idle, which time may have been used for loading or unloading, or may have been waste time. By reference to the record shown in Fig. 8, it will be noted that the first record was taken at 12.05 and the second at 12.10 and in the interval the vehicle traveled a distance of eight-tenths of a mile. The usual speed limit on a heavy truck is twelve miles an hour, which would be one mile for each five minutes and it will be seen that the driver was within his speed limit. The third record was not taken until 1.15 showing a lapse of one hour and five minutes. The distance shown on the second and third records is the same and it is apparent that the truck was idle during this time and as the regular five minute records were not taken it is apparent that the engine was idle. The fourth, fifth and sixth records were taken at regular five minute intervals but the distance shown in each record is the same, thus indicating that the vehicle stood idle for ten minutes with the engine running. The last three records were also taken at regular five minute intervals and the distance traveled between 1.35 and 1.45 was three and six-tenths miles, which is very much in excess of the usual speed limit. It will be apparent, therefore, that a complete check can be kept on all operations of the vehicle and that the time required for loading and unloading as well as for making specified trips can be easily determined. By requiring the driver to enter on his shipping bill or his order slip the time at which he begins each trip it will be a simple matter to connect the various records with the respective trips to which they relate. Inasmuch as the time entered on the shipping bill or order slip must agree with the printed record it will be obvious that any false entry by the driver can easily be detected.

It will be apparent that when the ignition switch is in the "on" position, as shown in Fig. 1, the detent 65 will be in its inoperative position, consequently the platen is free to operate. As the vehicle travels the distance registering devices will be operated therefrom through the worm wheel 23 and its associated devices, while the time registering devices will be driven from the clock through the gears 11 and 12. The clock will also rotate the shaft 32 and the cam 31, and the latter will engage the projection 33 on the platen arm and retract the platen against the tension of the spring 53, which acts on the shaft 30 through the arm 50 and cam 58. When the cam 31 completes one revolution the platen is released and is moved toward the type wheels to take an impression therefrom. The operating cam 31, being driven by the clock, will complete each revolution in an exact predetermined period of time, thus causing impressions to be taken at regular intervals. When the ignition switch is moved into "off" position to stop the engine the detent 65 will be moved to its operative position and, upon the next outward movement of the platen, will engage the nose 60 on the platen and lock the latter in its retracted position, thereby permitting the cam 31 to continue its rotation without operating the platen.

While we have shown and described one embodiment of our invention we wish it to be understood that we do not desire to be limited to the details thereof as various modifications may occur to a person skilled in the art.

Having now fully described our invention what we claim as new and desire to secure by Letters Patent is:

1. In a recording device for motor vehicles having devices for registering both time and distance, actuating means for said devices, and means controlled by said actuating means for automatically taking a record from said registering devices.

2. A recording device for motor vehicles having means for registering both time and distance and means for automatically taking a record of said registrations at predetermined intervals.

3. A recording device for motor vehicles having means for registering both time and distance, and means for automatically taking a record of said registrations at predetermined intervals of time.

4. In a recording device for motor vehicles having devices for registering both time and distance, actuating means for said devices, and means controlled by said actuating means for simultaneously taking a record from both of said registering devices.

5. A recording device for motor vehicles having means for registering both time and distance, means for taking a record from both of said registering means, and time controlled means for automatically operating said record taking means.

6. In a recording device, for motor vehicles, two registering devices, clock mechanism for operating one of said registering devices, means driven from a moving part of said motor vehicle for operating the other of said registering devices, a device to take a record from said registering devices, and a cam actuating by said clock mechanism to control the operation of said record taking device.

7. In a recording device for motor vehicles, two sets of printing counters, clock mechanism for operating one of said sets of counters, means driven from a moving part of said motor vehicle for operating the other set of counters, a platen to take a record from said counters, and a cam controlled by said clock mechanism for controlling the operation of said platen.

8. In a recording device for motor vehicles, two sets of printing counters, clock mechanism for operating one of said sets of counters, means driven from a moving part of said motor vehicle for operating the other set of counters, a platen to take a record from said counters, a spring to actuate said platen, and a cam operated by said clock mechanism to cause said platen to be operated by said spring at predetermined intervals of time.

9. In a recording device for motor vehicles, two registering devices, clock mechanism for operating one of said registering devices, means driven from a moving part of said motor vehicle for operating the other of said registering devices, a pivotally supported platen to take a record from said registering devices, a cam actuated by said clock mechanism to control the operation of said platen, a cam rigidly secured to said platen and mounted on the axis about which it moves, a rock arm mounted on an axis parallel with the axis of said platen, and a spring acting on said rock arm to hold the same in engagement with said cam, said cam being so arranged with relation to said arm that the latter will resist the movement of said platen into its retracted position.

10. In a recording device for motor vehicles, two registering devices, clock mechanism for operating one of said registering devices, means driven from a moving part of said motor vehicle for operating the other of said registering devices, a pivotally supported platen to take a record from said registering devices, a cam actuated by said clock mechanism to control the operation of said platen, a part mounted on the axis of said platen and rigidly secured thereto and having two projections, a rock arm mounted on an axis parallel with the axis of said platen and adapted to engage both projections on said part when said platen is in its normal position, and a spring acting on said rock arm to hold the same in engagement with said projections.

11. In a recording device for motor vehicles, two registering devices, clock mechanism for operating one of said registering devices, means driven from a moving part of said vehicle for operating the other of said registering devices, a pivotally supported platen to take a record from said registering devices, a cam actuated by said clock mechanism to control the operation of said record taking device, a record strip extending between said platen and said registering devices, a feeding device for advancing said record strip, a cam connected with said platen for movement about the axis thereof, a rock arm mounted on an axis parallel to the axis of said platen, a spring acting on said rock arm, said last mentioned cam being so arranged with relation to said rock arm that the retraction of said platen will cause the last mentioned cam to move said rock arm against the tension of said spring, and means connected with said rock arm for actuating the feeding mechanism for said record strip.

12. In a recording device for motor vehicles, two registering devices, clock mechanism for operating one of said registering devices, means driven from a moving part of said vehicle for operating the other of said registering devices, a pivotally supported platen to take a record from said registering devices, a cam actuated by said clock mechanism to control the operation of said record taking device, a record strip extending between said platen and said registering devices, a feeding device for advancing said record strip, an ink ribbon interposed between said record strip and said registering devices, feeding means for advancing said inking ribbon, a cam connected with said platen and arranged for movement about the axis thereof, a rock arm mounted on an axis parallel to the axis of said platen, a spring acting on said rock arm to hold the same in engagement with the last mentioned cam, said cam being so arranged with relation to said rock arm that when movement is imparted to said platen by the first mentioned cam the last mentioned cam will impart movement to said rock arm against the tension of said spring, and means for operatively connecting the feeding devices for said record strip and said ink ribbon with said rock arm.

13. A recording device for motor vehicles having means for registering both time and distance, means for automatically taking a record of said registrations at predetermined intervals, and means to prevent the taking of such a record when the motor of said vehicle is not in operation.

14. A recording device for motor vehicles having means for registering both time and distance, means for automatically taking a record of said registrations at predetermined intervals, and a device operatively connected with a part of the mechanism of the motor of said vehicle to control the operation of said record taking means.

15. The combination with a motor vehicle having means for controlling the operation of its motor, of devices for registering both time and distance, means for automatically taking a record of said registrations, and a device controlled by said motor controlling means to control the operation of said record taking means.

16. The combination with a motor vehicle having means for controlling the operation of its motor, of two registering devices, clock mechanism for actuating one of said registering devices, means controlled by a moving part of said vehicle for actuating the other of said registering devices, means controlled by said clock mechanism for taking a record from said registering devices, and a device controlled by means for controlling the operation of the motor to prevent the operation of said record taking means when said motor is idle.

17. The combination with a motor vehicle, and an ignition switch for controlling the operation of the motor thereof, of devices for registering both time and distance, means for automatically taking a record of said registrations, and means operatively connected with said ignition switch to control the operation of said record taking means.

18. The combination with a motor vehicle, and an ignition switch for controlling the operation of the motor thereof, of devices for registering both time and distance, means for automatically taking a record of said registrations, and means operatively connected with said ignition switch to prevent the taking of a record from said registering devices when said switch is open.

19. The combination with a motor vehicle, and an ignition switch for controlling the operation thereof, of two registering devices, clock mechanism for operating one of said registering devices, means driven from a moving part of said vehicle for operating the other of said devices, means controlled by said clock mechanism for taking a record from said registering devices, and means operatively connected with said ignition switch to prevent the operation of said record taking means when said switch is in its open position.

20. The combination with a motor vehicle, having an ignition switch to control the operation of the motor thereof, of two registering devices, clock mechanism for operating one of said registering devices, means driven by a moving part of said vehicle for operating the other of said registering devices, a spring actuated platen to take a record from said registering devices, means actuated by said clock mechanism for moving said platen against the tension of its spring and then releasing the same, and means operatively connected with said switch for controlling the operation of said platen by said spring.

21. The combination with a motor vehicle having an ignition switch to control the operation of the motor thereof, of two registering devices, clock mechanism for operating one of said registering devices, means driven by a moving part of said vehicle for operating the other of said registering devices, a spring actuated platen to take a record from said registering devices, means actuated by said clock mechanism to control the operation of said platen, and a locking arm connected with said ignition switch and movable into and out of an operative position with relation to said platen by the movement of said switch.

22. The combination with a motor vehicle, having an ignition switch to control the operation of the motor thereof, of two registering devices, clock mechanism for operating one of said registering devices, means driven by a moving part of said vehicle for operating the other of said registering devices, a spring actuated platen to take a record from said registering devices, a locking arm connected with said switch and having a yieldable projection arranged to be moved into the path of a part carried by said platen by the movement of said switch from one position to another.

23. The combination with a motor vehicle having an ignition switch to control the operation of the motor thereof, of two registering devices, clock mechanism for operating one of said registering devices, means driven by a moving part of said vehicle for operating the other of said registering devices, a spring actuated platen to take a record from said registering devices, means actuated by said clock mechanism to control the operation of said platen, said platen having a locking projection, a locking arm connected with said ignition switch, and having a projection movable into and out of the path of the projection on said platen.

24. The combination with a motor vehicle having an ignition switch to control the operation of the motor thereof, of two registering devices, clock mechanism for operating one of said registering devices, means driven by a moving part of said vehicle for operating the other of said registering devices, a spring actuated platen to take a record from said registering devices, means actuated by said clock mechanism to control the operation of said platen, said platen having a locking projection, a locking arm connected with said ignition switch and having a projection movable into and out of the path of the projection on said platen, the projection on said locking arm being yieldable to permit the projection on said platen to ride over the same when the platen is being moved against the tension of its spring.

In testimony whereof, we affix our signatures hereto.

ROBERT H. KIMES.
OSCAR F. SCHMIDT.